(12) United States Patent
Sloop

(10) Patent No.: US 7,198,865 B2
(45) Date of Patent: Apr. 3, 2007

(54) SYSTEM AND METHOD FOR REMOVING AN ELECTROLYTE FROM AN ENERGY STORAGE AND/OR CONVERSION DEVICE USING A SUPERCRITICAL FLUID

(76) Inventor: Steven E. Sloop, 512 NW. Roanoke, Bend, OR (US) 97701

( * ) Notice: Subject to any disclaimer, the term of this patent is extended or adjusted under 35 U.S.C. 154(b) by 388 days.

(21) Appl. No.: 10/340,358

(22) Filed: Jan. 9, 2003

(65) Prior Publication Data

US 2003/0186110 A1 Oct. 2, 2003

Related U.S. Application Data

(60) Provisional application No. 60/347,216, filed on Jan. 9, 2002.

(51) Int. Cl.
*H01M 6/50* (2006.01)
*H01M 2/36* (2006.01)

(52) U.S. Cl. .......................... 429/49; 429/95; 29/623.1

(58) Field of Classification Search ................ 429/49, 429/95; 29/623.1
See application file for complete search history.

(56) References Cited

U.S. PATENT DOCUMENTS

| | | |
|---|---|---|
| 5,185,564 A | 2/1993 | Miller |
| 5,847,538 A | 12/1998 | Yoshimatsu |
| 5,856,738 A | 1/1999 | Yoshimatsu |
| 5,888,463 A | 3/1999 | McLaughlin et al. |
| 6,080,508 A | 6/2000 | Dasgupta et al. |
| 6,273,921 B1* | 8/2001 | Stanford et al. ........... 29/623.1 |
| 6,284,412 B1 | 9/2001 | Minakata et al. |
| 6,329,096 B2* | 12/2001 | Kawakami et al. ........... 429/49 |
| 6,447,669 B1 | 9/2002 | Lain |
| 6,844,103 B2 | 1/2005 | Lee et al. |

FOREIGN PATENT DOCUMENTS

| | | |
|---|---|---|
| EP | 1056146 | 4/2000 |
| WO | WO02/23651 | 3/2002 |

OTHER PUBLICATIONS

Synthesis of Conductive Polypyrrole/Polyurethane Foams via a Supercritical Fluid Process, Fu et al., *Macromolecules*, vol. 30, pp. 7611-7613, 1997.
A Laboratory-Scale Lithium-Ion Battery Recycling Process, Contestable et al., *Journal of Power Sources*, vol. 92, pp. 65-69, 2001.
Chemical Reactivity of $PF_5$ and $LiPF_6$ in Ethylene Carbonate/Dimethyl Carbonate Solutions, Sloop et al., *Electrochemical and Solid-State Letters*, vol. 4, No. 4, pp. A42-A44, 2001.

* cited by examiner

*Primary Examiner*—Patrick Joseph Ryan
*Assistant Examiner*—Angela J. Martin
(74) *Attorney, Agent, or Firm*—Alleman Hall McCoy Russell & Tuttle LLP

(57) ABSTRACT

A system and method of removing an electrolyte from energy storage and conversion devices using a supercritical fluid are provided. The method includes placing a selected device in a container, adding a fluid to the container, adjusting at least one of a temperature and a pressure of the fluid in the container to form the supercritical fluid from the fluid in the container, exposing the supercritical fluid to the electrolyte, and removing the supercritical fluid from the container, wherein removal of the supercritical fluid causes removal of the electrolyte from the container.

34 Claims, 2 Drawing Sheets

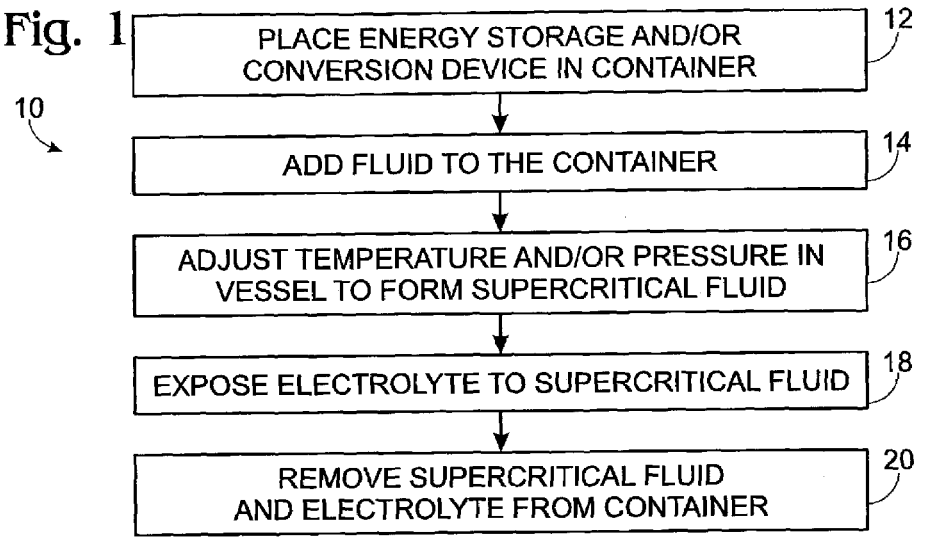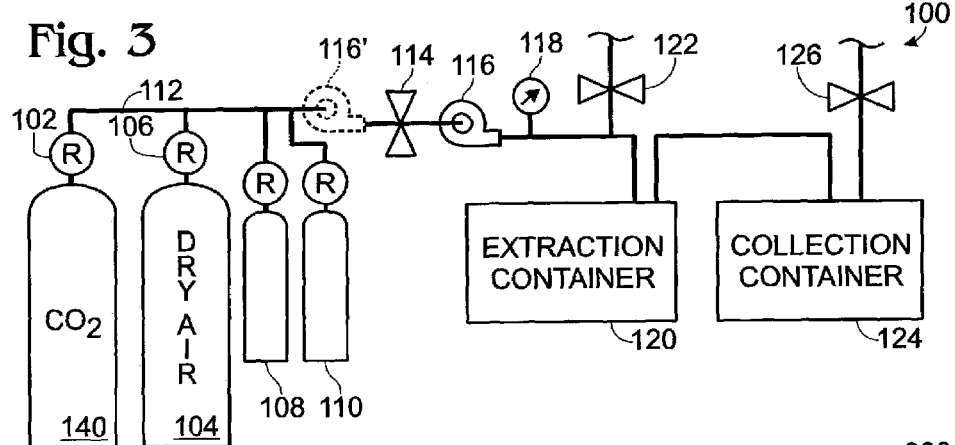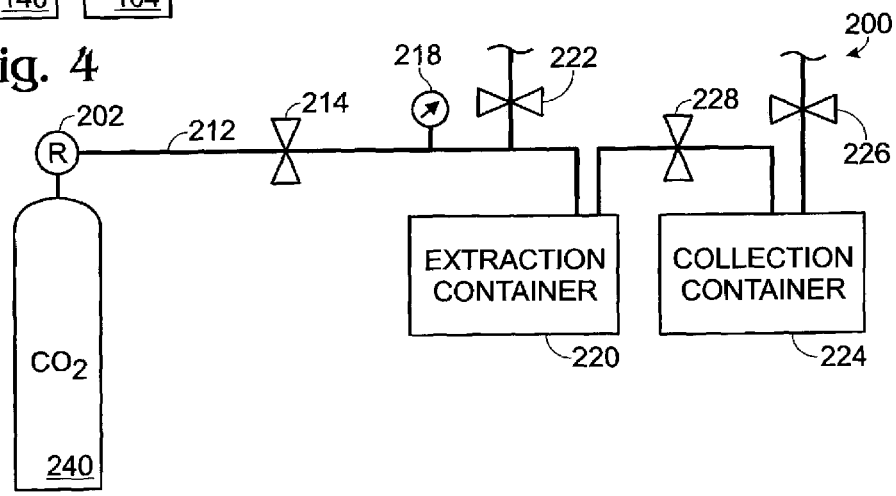

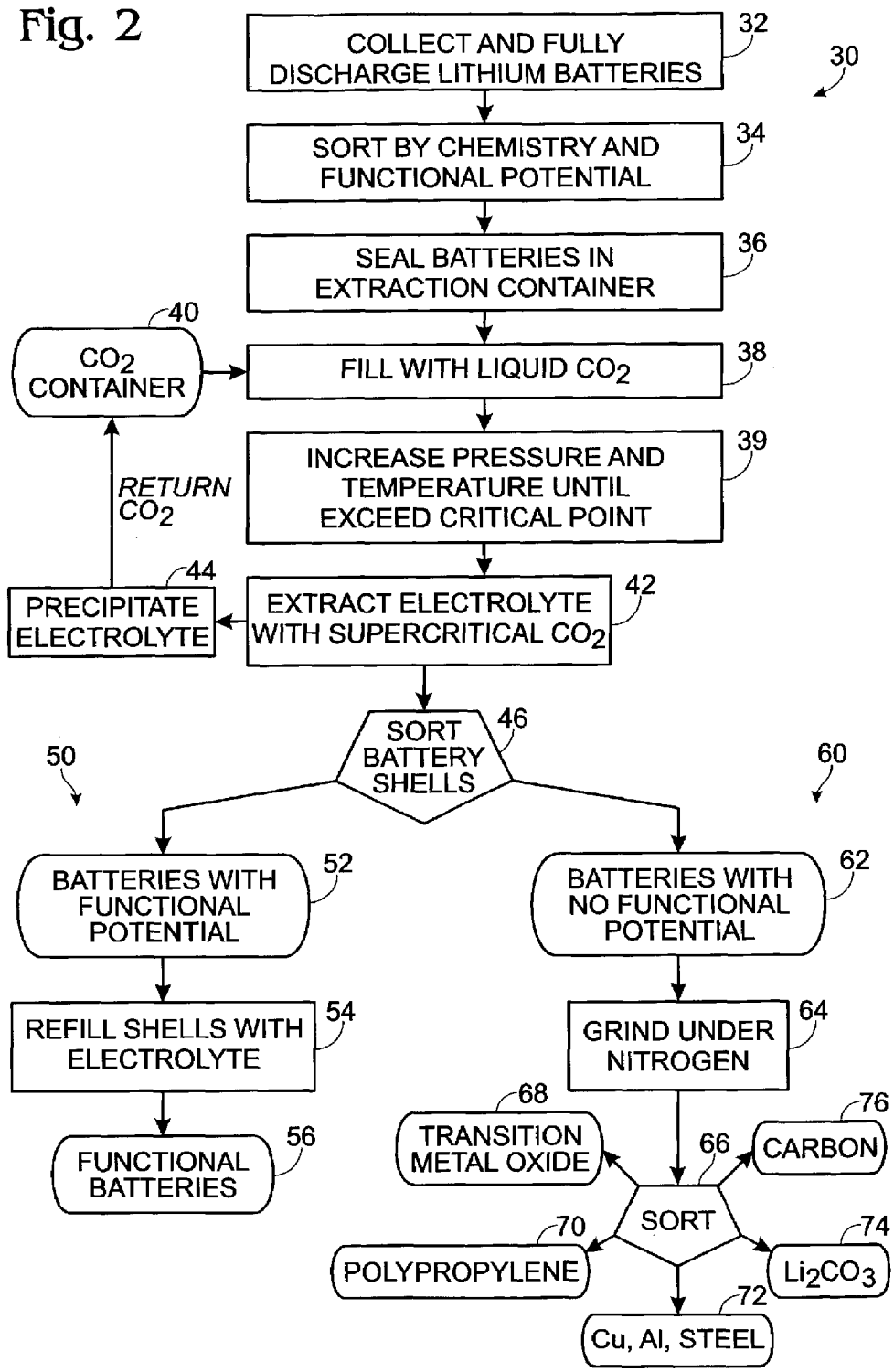

SYSTEM AND METHOD FOR REMOVING AN ELECTROLYTE FROM AN ENERGY STORAGE AND/OR CONVERSION DEVICE USING A SUPERCRITICAL FLUID

CROSS-REFERENCE TO PRIORITY APPLICATION

This application claims priority under 35 U.S.C. § 119(e) from U.S. provisional patent application Ser. No. 60/347,216, filed Jan. 9, 2002, the disclosure of which is hereby incorporated by reference.

TECHNICAL FIELD

The present invention relates to a system and method for extracting an electrolyte from a lithium-containing energy storage device and/or energy conversion device via a supercritical fluid.

BACKGROUND

Lithium batteries are important power sources for many consumer electronics devices and constitute a multibillion-dollar market. Part of the reason for continued market growth is that lithium battery technology is replacing Ni—Cd and metal hydride technology in portable consumer electronics. The low volumetric energy density for lithium allows for small volume, high capacity battery design in comparison to Ni—Cd and metal hydride batteries.

Typical lithium batteries may be classified as either primary or secondary lithium batteries. Both of these types, like all batteries, have an electrolyte, anode and cathode. Primary lithium batteries typically utilize a lithium metal anode and a metal oxide (for example, $MnO_2$) cathode. The primary lithium battery operates via the following half-reactions:

Anode reaction: $Li \rightarrow Li^+ + e^-$  (1)

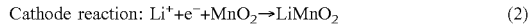

Cathode reaction: $Li^+ + e^- + MnO_2 \rightarrow LiMnO_2$  (2)

This redox reaction is irreversible. Therefore, batteries constructed with these materials cannot be recharged.

Secondary lithium batteries typically utilize a $LiC_x$ anode a $CoO_2$ cathode. $LiC_x$ is lithium-intercalated graphitic carbon, which hereinafter may be referred to as "reduced graphite." Its reactivity is similar to lithium metal. The secondary lithium battery operates via the following half reactions:

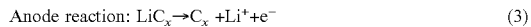

Anode reaction: $LiC_x \rightarrow C_x + Li^+ + e^-$  (3)

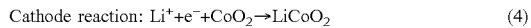

Cathode reaction: $Li^+ + e^- + CoO_2 \rightarrow LiCoO_2$  (4)

This particular redox-couple produces 3.6 V. Furthermore, the reaction is reversible. Therefore, the application of −3.6V to the cell pushes the lithium-ions back into the carbon. Lithium cobalt oxide and graphitic carbon are utilized in rechargeable lithium-ion batteries. Ultimately, these devices have a common feature: both require the use of non-aqueous electrolytes to avoid unwanted side reactions in the device.

The vast majority of electrolyte used in "lithium-ion" batteries is composed of a lithium salt dissolved in an alkyl carbonate. One of the most common electrolytes includes the salt $LiPF_6$ dissolved in ethylene carbonate and diethyl carbonate (1.2 M $LiPF_6$ in 1:1 EC:DEC). Other formulations may substitute ethyl methyl carbonate for DEC or include a third solvent such as butyrolactone. Various additives may be included for performance enhancement. Furthermore, fluorinated esters or fluorinated alkyl phosphates may be added as a flame retardant to address flammability issues. A small number of "gel" or "polymer electrolyte" (lithium-polymer) systems exist in which a polymer supports a liquid electrolyte (of similar composition described above). These rechargeable systems use anodes made of graphitic carbon and cathodes composed of $Li_xCo_yO_2$, $LiCo_xNi_yO_2$, or $MnO_2$. Finally, a unique rechargeable system departs from the use of graphitic carbon. The Li—S cell uses a lithium metal anode, polymer electrolyte and sulfur cathode.

Improvement in cycle life, safety and thermal stability of lithium battery technology has accelerated its use as a portable power source. However, after approximately two years of regular use, these batteries may start to fail. Often the batteries are merely thrown away after failure. However, the batteries may contain toxic or otherwise dangerous component chemicals that make them unsuitable for disposal in a landfill. Furthermore, some of the constituent components may be relatively expensive to produce for use in new batteries. Other lithium-containing power storage devices, such as pseudocapacitors, ultracapacitors, supercapacitors and capacitors, may suffer similar problems.

Due at least in part to these problems, as well as the existence of a significant lithium waste stream, environmental laws, industrial standards and collection services have arisen to help promote lithium battery recycling. These activities help to reduce disposal, and also may help to provide valuable raw materials without compromising precious resources through alternative activities such as mining.

Various recycling schemes for lithium batteries are known. For example, U.S. Pat. No. 5,888,463 to McLaughlin et al. describes a recycling process in which water is used to react with lithium metal to allow the extraction of lithium carbonate from shredded lithium batteries. The process involves many separate steps. First, the batteries are cooled with liquid nitrogen. This may require many hours, and a large input of energy, if the battery mass is relatively large. Next, the batteries are shredded to expose their components, and then water is added to react with the lithium.

Metallic lithium or reduced graphite reacts with protic solvents such as water or alcohol to produce $H_2$

$Li + H_2O \rightarrow LiOH + \frac{1}{2}H_2$  (5)

Any $H_2$ produced is burned during processing. Salts are captured through precipitation of saturated solutions, and purification of the solution is achieved across a $Li^+$ exchange membrane. This may require the pH to be adjusted with LiOH and $H_2SO_4$ to avoid the production of $H_2S$ gas. The product recovered from the ion-exchange process is LiOH, which reacts with $CO_2$ gas to produce high purity $Li_2CO_3$. Finally, water is thermally removed from the carbonate product.

The McLaughlin aqueous-based lithium recycling process may suffer various drawbacks. First, the use of cryogenic liquid nitrogen to cool the batteries may be expensive and time-consuming. Second, the hydrogen gas produced in the reaction of lithium with water may pose an explosion hazard. Third, poisonous $H_2S$ gas may be produced in the reaction mixture. Fourth, the thermal removal of water from the carbonate product may be energy intensive. Fifth, the process produces aqueous waste that may require disposal under expensive permits. Sixth, the water may compromise the functionality of the electrolytes, cathodes and anodes as recycled battery materials for use in new batteries.

SUMMARY

One aspect of the present invention provides a method of removing an electrolyte from energy storage and conversion devices using a supercritical fluid. The method includes placing a selected device in a container, adding a fluid to the container, adjusting at least one of a temperature and a pressure of the fluid in the container to form the supercritical fluid from the fluid in the container, exposing the supercritical fluid to the electrolyte, and removing the supercritical fluid from the container, wherein removal of the supercritical fluid causes removal of the electrolyte from the container.

BRIEF DESCRIPTION OF THE DRAWINGS

FIG. 1 is a flow diagram of an embodiment of a method of extracting an electrolyte from a lithium-containing energy storage and/or conversion device according to the present invention.

FIG. 2 is a flow diagram of an embodiment of a method of recycling and/or refurbishing a lithium-containing energy storage and/or conversion device according to the present invention.

FIG. 3 is a schematic diagram of a first exemplary system for extracting an electrolyte from an energy storage and/or conversion device according to the embodiment of FIG. 1.

FIG. 4 is a schematic diagram of a second exemplary system for extracting an electrolyte from an energy storage and/or conversion device according to the embodiment of FIG. 1.

DETAILED DESCRIPTION OF THE DEPICTED EMBODIMENTS

FIG. 1 shows, generally at 10, one embodiment of a method of extracting an electrolyte from a lithium-containing energy storage and/or conversion device via a supercritical fluid according to the present invention. Method 10 may be used to remove electrolytes from lithium-containing energy storage and/or conversion devices, such as lithium-containing batteries, and may also be used to remove buildup of waste products at electrode-electrolyte interfaces that can cause excess internal impedance.

Method 10 first includes placing a desired lithium-containing device in an extraction container at 12, and then adding a fluid to the container at 14. Next, at least one of the temperature and pressure of the fluid in the container is adjusted at 16 to form a supercritical fluid phase from the fluid in the extraction container. The supercritical phase is a phase that forms at temperatures and/or pressures higher than the critical point for the material, where the liquid/gas phase boundary ceases to exist. The fluid behaves as a dense gas, and may have very different solubility, surface tension, and other fluidic properties than corresponding sub-critical fluids of the same chemical composition. Forming the supercritical fluid in the extraction container exposes the electrolyte inside the energy storage device to the supercritical fluid, as indicated at 18 and described in more detail below. The supercritical fluid may be a nonaqueous supercritical fluid to help avoid the production of hydrogen gas during the process. After exposing the electrolyte to the supercritical fluid, the supercritical fluid is removed from the extraction container at 20. Selection of a supercritical fluid in which the electrolyte is soluble allows the electrolyte to be removed from the extraction container dissolved in the supercritical fluid. The electrolyte may then be recovered from the supercritical fluid by evaporation of the supercritical fluid. Where the electrolyte is not soluble in the supercritical fluid, the supercritical fluid from the extraction container, the pressure caused by the removal of the supercritical fluid from the extraction container may still remove electrolyte from within the energy storage device.

The use of method 10 to recover electrolytes may help to avoid many of the negative aspects of aqueous extraction methods through the use of the non-aqueous, aprotic, supercritical fluid as a solvent. The advantages of method 10 are described herein in the context of $CO_2$, but it will be appreciated that many or all of the advantages described below may also be present when other supercritical fluids are used. First, cooling of the energy storages devices before adding the solvent is not required because some $CO_2$ and a small amount of oxygen react with lithium metal in the sample slowly at ambient temperature to produce solid $Li_2CO_3$. While a completely discharged energy storage device may have essentially no remaining lithium metal, batteries often have some lithium that is disconnected from the battery circuit. Disconnected lithium cannot be removed through simple discharge of the battery. Thus, treating the disconnected lithium with $CO_2$ forms lithium carbonate, which lacks the fire hazard associated with lithium metal. Furthermore, the reaction of the lithium with $CO_2$ does not produce $H_2$ gas, which greatly reduces the risk of explosion.

Additionally, under pressure, the supercritical fluid penetrates the body of the lithium battery so that crushing and shredding the battery is not necessary. Furthermore, lithium battery electrolytes, as well as oligo-carbonate waste products that may form at the electrode-electrolyte boundary from the carbonate electrolyte solvents, are soluble in supercritical $CO_2$ and can be extracted from the battery without compromising their anhydrous character. Furthermore, the recovered pure electrolyte may be precipitated from the supercritical fluid solution by simply reducing the pressure of the fluid in a collection vessel. This also permits the fluid to be reused in a closed loop system, thus saving expense of using new fluid for each extraction.

Method 10 may be implemented in a variety of ways, and may be used to recover electrolytes from many different types of lithium-containing energy storage devices. FIG. 2 shows, generally at 30, another embodiment of a method of extracting an electrolyte from a lithium-containing energy storage device. Method 30 illustrates a more detailed implementation of the general steps outlined above for method 10, and also illustrates two exemplary, alternate paths for processing the casing and other portions of the energy storage device once the electrolyte has been removed—one for battery refurbishing, and one for battery pulverization and recycling. Method 30 is described in the context of a lithium battery, but it will be appreciated that the method may be applied to any other suitable energy conversion and storage device, such as a lithium-containing capacitor, or even some suitable fuel cells.

Method 30 includes first collecting one or more lithium batteries at 32, and then sorting the batteries at 34, to identify possible candidates for refurbishment. Typically, the lithium batteries (or other lithium-containing wastes) are collected in relatively large quantities for batch extraction processes. In the event that some of the batteries may have leaks, the initial collection may be performed in a dry, cool, well-ventilated area fitted with non-aqueous fire-suppression equipment at hand. Although leaky cells are unlikely, fire may potentially result when lithium is exposed to an oxidizing agent such as air or water.

The lithium batteries collected for electrolyte extraction may have any suitable electrolyte. As described above, typical electrolytes used in lithium-containing batteries are composed of a lithium salt or salts dissolved in an alkyl carbonate solvent or solvent mixture. Examples of lithium salts include, but are not limited to, $LiPF_6$, $LiAsF_6$, $LiBF_4$, $LiClO_4$, lithium pentafluorothiodifluoromethanesulfonate, LiBETI (lithium bis perfluoroethanesulfonimide), LiTFSI (lithium bis(trifluoromethylsulfonyl)imide), LiTf (lithium trifluoromethanesulfonate), and LiTFSM (lithium trifluoromethanesulfonylmethide), dissolved in ethylene carbonate and diethyl carbonate (1.2 M $LiPF_6$ in 1:1 EC:DEC). Examples of solvents for the lithium salt include, but are not limited to, dimethoxyethane (DME), dimethyl carbonate (DMC), diethyl carbonate (DEC), dipropyl carbonate (DPC), dioxolane, ethyl methyl carbonate, ethylene carbonate, and propylene carbonate. Other compounds that may also be present in the electrolyte, such as thionyl chloride and iodine (sometimes found in primary lithium batteries), may also be extracted via method 30.

The lithium batteries may be sorted based on any suitable characteristics. For example, the batteries may be sorted as a function of manufacturer and battery chemistry. Where battery chemistry is used as a sorting criterion, any rechargeable battery that does not exhibit structural damage or a short circuit may be classified as a candidate to be refurbished instead of broken down into its constituent parts. It will be appreciated that, in the sorting process, the measured impedance level of a battery may vary as a function of battery size, measurement temperature, chemistry and manufacturer. Thus, cut-off values for refurbishment of the battery v. pulverization of the battery may be determined on a case-by-case basis.

After sorting is complete, any labels may be removed from the battery casings. Also, any dirt, moisture, oils, etc. may be removed via an appropriate cleaning routine, for example, via an alcohol (isopropanol, isobutanol) rinse. The de-labeling and cleaning processes leave only the packaging material (typically a steel case) and inner contents of the battery behind.

After the batteries have been sorted, they are sealed in a high pressure extraction container at 36, which is then filled, at 38, with a suitable fluid. Many fluids may be suitable for use in the supercritical extraction methods disclosed herein. Suitable fluids include those that are a gas at ambient temperature so that recovery of the dissolved electrolyte does not require a large input of energy. Other desirable characteristics of the fluid include, but are not limited to, low toxicity, low cost, high solubility for the electrolyte. Suitable fluids may also be aprotic (to avoid hydrogen gas formation when converting lithium metal to lithium carbonate) and anhydrous. As described above, $CO_2$ possesses many properties that make it a particularly good fluid for extracting the electrolytes. Besides $CO_2$, examples of other suitable fluids include, but are not limited to, $N_2$, $O_2$, $H_2$, Ar, He, Ne, freon, dimethylether, $BF_3$, $PCl_5$, $NH_3$, $Cl_2$, $F_2$, $NH_3$, $NR^3$ (R=methyl, ethyl, propyl, butyl), $N_2O$, and dimethyl ether. Furthermore, fluids such as $Br_2$ and $CS_2$ that are liquid at ambient temperature, or even $I_2$, which is solid at room temperature, may potentially be used to dissolve electrolytes, but they may require energy input to distill the material to precipitate the electrolyte for recovery. Before filling the extraction container with the fluid, one or more purge cycles of the fluid may be run through the extraction container to remove any moisture or other contaminants. In FIG. 2, the $CO_2$ container for the addition of $CO_2$ is indicated at 40.

Various additives may be added to the fluid to enhance its performance in the electrolyte extraction process. For example, solubility enhancers may be added to improve the solubility of the electrolyte in the fluid. Examples of suitable solubility enhancers for enhancing the solubility of lithium salts in supercritical $CO_2$ include, but are not limited to, alkyl ethers with the general formula $OR_2$ (R=methyl, ethyl, propyl, butyl); oligoethers selected from the group consisting of glyme, d-glyme, tri-glyme, tetra-glyme, and ethyleneglycol alkyl ethers; nitrobenzene; acetonitrile; alcohols with the general formula ROH (R=methyl, ethyl, propyl, butyl); allyl alcohols; unsaturated alcohols; $CS_2$; methyl compounds with the general formula $CH_xCl_{4-x}$; and dimethylsulfoxide.

The fluid may also contain a Lewis base as an additive. This is because electrolytes containing $LiPF_6$, $LiBF_4$ or $LiAsF_6$ may pose some unique reactivity problems. When heated, these salts generate LiF and the respective Lewis acids $PF_5$, $BF_4$, $AsF_5$ in the following equilibrium:

$$LiPF_{6(diss)} \rightleftharpoons LiF_{(s)} + PF_{5(g)} \qquad (6)$$

If the solubility for LiF is low, it may precipitate and thus may help drive the equilibrium to the right. The Lewis acid produced may react with other battery components, and also may potentially produce HF if small quantities of water are available. Equilibrium (6) may be kept to the left side by maintaining a high pressure, such as in the supercritical extraction process described herein, and operational temperatures below 60° C. It is unlikely that Lewis acids would be generated in the supercritical extraction process described herein, but a Lewis base may be added to the fluid to react with any Lewis acids on the chance that they may be produced. Examples of suitable Lewis bases for use in the fluid include, but are not limited to, ammonia, amines with the general formula $NH_xR_{3-x}$ (R=methyl, ethyl, propyl, butyl), and pyridine.

After adding the fluid, the pressure and temperature of the fluid are increased at 39 until conditions exceed the critical point for the fluid (31.1 degrees Celsius, 1075 psi/73 atm for $CO_2$). Where $CO_2$ is used as the fluid, the pressure in the extraction container may be increased by pumping liquid $CO_2$ into the extraction container. As the pressure increases (typically beginning around 5 atm/75 psi), the battery casings are breached, and the interiors become permeated with liquid $CO_2$. Audible cracking of the cell was detected at 800 psi, indicating that the cells were breached well below the critical pressure of the $CO_2$. Supercritical $CO_2$ has a very low surface tension, allowing it to contact and imbibe sub-micron sized pores. Thus, there is no need to increase the surface area of the material by grinding or milling prior to adding $CO_2$.

Breaching the walls of the battery casings may occur as quickly as within the first few minutes of the pressurization. Reactions within the cell may begin to occur immediately after the casings are breached. Liquid $CO_2$ (from a standard $CO_2$ gas cylinder) typically enters the extraction container at a temperature between −56 and 20 degrees Celsius. The low temperature may be advantageous, as it may cause the conversion of lithium metal to lithium carbonate to occur at a relatively slow rate. Where recycled $CO_2$ is used, it may be desirable to cool the $CO_2$ prior to introducing it into the extraction container to slow the reaction between the lithium and $CO_2$. Alternatively, the $CO_2$ may be added to the extraction container in either solid or supercritical form. Where the $CO_2$ is added to the extraction container in solid form, enough $CO_2$ should be added so that the pressure exceeds the critical pressure when the solid $CO_2$ has completely sublimed.

At this point, any disconnected lithium metal or reduced carbon ($LiC_x$) reacts with carbon dioxide to produce CO and $Li_2CO_3$.

$$Li + 2CO_2 \rightarrow Li_2CO_3 + CO \qquad (7)$$

At these low temperatures (−56–20 degrees Celsius) the reaction proceeds slowly. A small quantity (4%) of dry air or oxygen may be added during the reaction period to avoid the production of CO.

$$Li + \tfrac{1}{2}O_2 + CO_2 \rightarrow Li_2CO_3 \qquad (8)$$

To assist reaction completion, the temperature is gradually increased to 31 degrees Celsius, and the pressure increased to 2000 psi (over a time period of 30 min). Once the fluid has reached a supercritical phase, the pressure helps to ensure that the $CO_2$ is able to react with the largest part of the lithium metal or reduced carbon. The temperature may be increased to a temperature over 31 degrees Celsius if desired, up to and even over 60 degrees Celsius. The progress and control of the conversion of metallic lithium to lithium carbonate may be monitored by measuring and limiting the concentration of air added to the mixture. Alternatively, the $CO_2$ may be used in pure form, and any CO produced in the conversion may be removed in the $CO_2$ recycling stage. The use of other common lithium scavengers such as water or isobutyl alcohol is not advisable, as these compounds may cause the production of hydrogen gas and LiOH as described above.

It will be appreciated that the battery casings may also be breached before being added to the extraction extraction container. Under this scheme, the battery casings may be breached by any suitable method. Examples of suitable methods include, but are not limited to, mechanical drilling, piercing, laser drilling, and milling.

Some battery (or other power storage and/or conversion devices) may include a pressure relief valve built in to the battery casing. Where this valve is present, the valve may fail and be breached before the cell walls are cracked. Likewise, a battery casing may be designed that has a valve designed for the express purpose of failing during the pressurization step of the extraction process so that each battery casing fails in a predictable location. Such a valve may allow the addition of a new volume of electrolyte in the refurbishing process to be automated, as the point of failure (and thus the point at which the new volume of electrolyte may be added to the casing) may be the same for each battery. The same valve could function as an emergency pressure relief valve as well, failing outwardly when gas pressure builds up in the battery during use, and failing inwardly during extraction of electrolyte. The pressures at which each failure takes place may be tailored via the mechanical design of the valve latching mechanism.

After the temperature and pressure are increased to the appropriate levels, electrolyte extraction commences at 42. The extraction may either be dynamic, in which $CO_2$ is constantly pumped through the system, or static, in which the batteries soak in a fixed amount of $CO_2$ for a period of time. During the extraction process, electrolyte solvents and salts dissolve in the supercritical $CO_2$. Where a dynamic extraction is used, the supercritical fluid is pumped through the extraction container and dissolves electrolyte as it flows through the opened batteries. Where a static extraction is used, the supercritical fluid is transported to a recovery container after a desired amount of time has passed.

Solubility of the electrolyte solvent and salts can be controlled through the supercritical pressure, temperature and the use of the additives described above. Once the electrolyte is dissolved, it moves in solution with SCF to a precipitation vessel, as indicated at 44 in FIG. 2. Releasing $CO_2$ gas in the precipitation vessel reduces the pressure and precipitates electrolyte solvents and salt. The process continues until achieving quantitative extraction of the electrolyte components. As described above, the $CO_2$ may then be used for another extraction. Data from an example extraction are shown in Table 1 below.

TABLE 1

Weight percent of components removed after treatment

| Component | 25° C./2000 psi | 50° C./4100 psi | Time/min |
|---|---|---|---|
| Ethylene Carbonate (EC)/Diethyl Carbonate (DEC) (1:1) | 71% | 76% | 10 |
| $LiPF_6$ | 0 | 0 | 120 |
| EC/DEC/$LiPF_6$ (11% by weight $LiPF_6$) |  | 92% | 120 |

After the electrolyte is removed, the remaining components include the casing, cathode, anode, $Li_2CO_3$ and separator in a dry, non-flammable, minimally reactive form. They are thus essentially battery-shells, without the electrolyte and the reactive lithium. Extraction also removes oligo-carbonates, oligo-ethers and small molecules that represent impurities and waste products deposited at the solid-electrolyte-interface during ordinary use of the battery.

At this point, the shells from each batch that was determined at step 34 to be suitable for refurbishing may be again sorted at 46 to determine if any of the batteries Were short-circuited or otherwise damaged by the extraction process sufficiently to render the batteries unsuitable for refurbishing. Those which were damaged may be safely shredded and separated into their pure and dry components through sifting and density separation methods. The shells to be refurbished may simply be refilled with electrolyte and recharged to operate as a functioning lithium-ion battery.

An exemplary refurbishing process is indicated generally at 50 in FIG. 2, and an exemplary pulverization/recycling process is indicated generally at 60. First referring to refurbishing process 50, the process is typically performed only on battery shells with potential to function as a battery. Once these batteries are identified (via impedance measurements or other suitable methods), they are prepared for refurbishing in a dry, moisture free environment. The batteries can be refurbished under the assumption that the cathode, anode and separator are functional. Processing in the supercritical fluid removes oligo-carbonates and ethers that have accumulated throughout the battery and degraded its performance.

Next, electrolyte is injected into the battery at 54 to produce a discharged cell. Using automated equipment, if desired, a small hole may be placed in the wall of the steel container. Through the hole, the battery may be refilled with a programmed quantity of electrolyte, again using automated equipment if desired. Finally, the hole and breach created earlier are sealed with epoxy and the battery is ready for recharging. The breach occurs in the same location (as a function of manufactured battery geometry) from battery to battery. Thus, sealing is well suited for automated treatment.

Batteries that do not recharge or cannot charge and discharge to their full capability, as indicated at 62 in FIG. 2, may instead be subjected to recycling process 60. For example, a Panasonic CGR18650 lithium-ion battery has a 1,500 mAh capacity. If the capacity of the refurbished battery is not equal to the original battery, it is recycled. The alternate step to refurbishing is recycling the components found in the lithium batteries or the lithium containing waste. Batteries that were identified for recycling are pulverized and sorted into their components at 64. Any suitable pulverization process may be used, for example, ball milling. The pulverization may be performed in the absence of water and oxygen to avoid contamination of the materials.

Following the milling process, the solid materials may be sorted at 66 into metal oxides 68 such as cobalt oxide, cobalt-nickel oxide and manganese oxides, polypropylene 70, $Li_2CO_3$ 72, metals such as copper and aluminum foil 74, and graphitic carbon 76. The particular compounds will vary with the battery chemistry or nature of the lithium-containing waste. All of these components may be reusable for many applications, including new lithium batteries.

The graphitic carbons from used lithium batteries and recycled using supercritical $CO_2$ have the potential to be more valuable as an anode than the similar parent material that went into the original battery. These carbons have undergone lithium intercalation and have not been reintroduced to air or water in the recycling treatment program. Therefore, they have established pathways for lithium ion movement and their surfaces have been stripped of reactive functional groups. In addition to the value of the salts, solvents and oxides, this process should produce high value amorphous carbons useful for lithium battery anodes.

The use of the methods described herein to extract electrolyte from lithium-containing power storage and/or conversion devices offer the additional advantage that they may be implemented via simple apparatus. FIG. 3 shows generally at 100 an exemplary embodiment of a first reaction system suitable for use with methods 10 and 30. System 100 includes a $CO_2$ tank 140 (corresponding to $CO_2$ tank 40 of FIG. 2) for introducing $CO_2$ into an extraction container 120. A regulator 102 controls the pressure of the $CO_2$ introduced into a manifold 114 positioned fluidically upstream of extraction vessel 120. Other fluid tanks may be provided for introducing various additives into the system. For example, a dry air tank 104 may be provided for adding dry air to prevent the formation of CO in the lithium carbonate production process as described above. The dry air tank typically is attached to a regulator 106 to allow control of the partial pressure of oxygen in manifold 114. Also, a Lewis base tank 108 may be provided for adding a Lewis base to the system to react with any Lewis acids formed by the heating of lithium salts during the extraction process. Furthermore, a tank containing a solubility enhancer 110 may be provided for adding small amounts of a solubility enhancer as described above in reference to FIGS. 1 and 2. While system 100 is described in the context of a $CO_2$ system, it will be appreciated that any of the other fluids described above may be used in place of, or in conjunction with, the $CO_2$ where the solubility of a particular electrolyte salt or solvent is compatible with the other fluid or fluids.

Fluid flow from manifold 112 to extraction container 120 is controlled by an inlet valve 114. The use of a single valve to control fluid flow into extraction container 120 ensures that the fluids are well-mixed upon entering the extraction container. However, it will be appreciated that the fluids may also be introduced into extraction container 120 via separate manifolds and valves if desired. Furthermore, a pump 116 may be used to push fluids through extraction container 120 at a constant rate. Due to the high pressures used in extraction vessel 120, pump 116 should be a high-pressure pump, rated to 3000 psi or greater. Pump 116 may be positioned either downstream of inlet valve 114, as indicated in solid lines, or upstream of inlet valve 114, as indicated in dashed lines at 116'. A pressure gauge 118 allows pressure within extraction vessel 120 to be continuously monitored. It will be understood that manifold 112, or any other suitable part of system 120, may also have a pressure gauge if desired.

Extraction container 120 is configured to accept insertion of a sample or batch of energy storage and/or conversion devices, and to form an airtight seal to prevent moisture from entering the container. Extraction container 120 may include a heating element to allow the container to achieve the elevated temperatures necessary to form a supercritical phase. Because system 120 is a continuous flow system, supercritical fluid flows continuously through extraction container 120 and collection container 124. Collection container 124 is configured to allow the supercritical fluid to cool and expand, thus precipitating electrolyte solvents and salts, and any other materials recovered from the batteries into the collection container. A bleed valve 122 may be included to help prevent buildups of pressure in the system.

FIG. 4 shows, generally at 200, another exemplary embodiment of a reaction system suitable for use with methods 10 and 30. Reaction system 200 is similar to reaction system 100 in many respects, as it includes a $CO_2$ tank connected to a manifold 212 by a regulator 202. Manifold 212 is fluidically connected to extraction container 220 by an inlet valve 214, and pressure in extraction vessel 220 is monitored by a pressure gauge 218.

However, unlike system 100, system 200 is not a continuous-flow system, but rather is configured to be a static system. A desired pressure of supercritical $CO_2$ may be introduced into extraction container 220 from manifold 212, and then the inlet valve and an extraction container outlet valve 228 may be closed for a duration of time to let the $CO_2$ penetrate the batteries. Once the period of time has passed, extraction container outlet valve 228 may be opened to expand the supercritical fluid into collection container 224 and out of outlet valve 226 to precipitate the recovered electrolyte salts and solvents in the collection container.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method of removing an electrolyte from an energy storage and conversion device using a supercritical fluid, comprising:
   placing the device in a container;
   adding a fluid to the container;
   increasing at least one of a temperature and a pressure of the fluid in the container to form the supercritical fluid from the fluid in the container;
   removing at least a portion of the electrolyte from the device with the supercritical fluid; and
   removing the supercritical fluid from the container.

2. The method of claim 1, wherein the device is a lithium battery.

3. The method of claim 1, wherein the selected device is selected from the group consisting of lithium-containing pseudocapacitors, ultracapacitors and supercapacitors.

4. The method of claim 1, wherein the selected device is a capacitor.

5. The method of claim 1, wherein the electrolyte is soluble in the supereritical fluid.

6. The method of claim 1, wherein the electrolyte is physically displaced from the selected device by the supercritical fluid.

7. The method of claim 1, wherein the electrolyte includes a lithium salt and an alkyl carbonate solvent.

8. The method of claim 7, wherein the lithium salt is selected from the group consisting of $LiPF_6$, $LiAsF_6$, $LiBF_4$, $LiClO_4$, lithium pentafluorothiodifluoromethane sulfonated, LiBETI (lithium bis perfluoroethanesulfonimide), LiTFSI (lithium bis-trifluorosulfonimide), LiTF (lithium trifluoromethanesulfonate), and LiTFSM (lithium trifluoromethanesulfonylmethide).

9. The method of claim 7, wherein the solvent is selected from the group consisting of dimethoxyethane (DME), dimethyl carbonate (DMC), diethyl carbonate (DEC), dipropyl carbonate (DPC), dioxolane, ethyl methyl carbonate, ethylene carbonate, and propylene carbonate.

10. The method of claim 1 where the electrolyte includes thionyl chloride.

11. The method of claim 1, wherein the fluid includes $CO_2$ as a primary component.

12. The method of claim 11, wherein the $CO_2$ is introduced into the container at a temperature of between approximately —56 and 31° C.

13. The method of claim 12, wherein the $CO_2$ is added to the container to a pressure of between approximately 5 atm and 73 atm.

14. The method of claim 12, wherein the $CO_2$ is added to the container in solid form.

15. The method of claim 12, wherein the $CO_2$ is added to the container in supercritical form.

16. The method of claim 12, wherein the $CO_2$ is added to the container in gaseous form.

17. The method of claim 11, wherein the $CO_2$ is heated to a temperature of at least 31° C. after the $CO_2$ is added to the container.

18. The method of claim 1, wherein the fluid includes as a primary component a material selected from the group consisting of $N_2$, $O_2$, $H_2$, Ar, He, Ne, freon, dimethylether, $BF_3$, $PCl_5$, $NH_3$, $Cl_2$, $F_2$, $Br_2$, and $I_2$.

19. The method of claim 1, further comprising adding a solubiity enhancer to the fluid in the container to enhance the solubility of the electrolyte in the fluid.

20. The method of claim 19, wherein the solubility enhancer is selected from the group consisting of alkyl ethers with the general formula $OR_2$ (R =methyl, ethyl, propyl, butyl); oligoethers selected from the group consisting of glyme, d-glyme, tri-glyme, tetra-glyme, and ethyleneglycol alkyl ethers; nitrobenzene; acetonitrile; alcohols with the general formula ROH (R =methyl, ethyl, propyl, butyl); allyl alcohol; unsaturated alcohols; $CS_2$; methyl compounds with the general formula $CH_xCl_{4-x}$; and dimethylsulfoxide.

21. The method of claim 1, further comprising reducing the pressure of the supereritical fluid and recovering the electrolyte.

22. The method of claim 21, wherein the electrolyte is recovered by evaporation of the fluid after reducing at least one of a pressure and a temperature of the fluid to a sub-critical level.

23. The method of claim 22, wherein the fluid is $CO_2$, wherein the selected device contains lithium that is converted to $Li_2CO_3$ by the $CO_2$, and wherein CO produced by the conversion of lithium to $Li_2CO_3$ is removed from the $CO_2$ after evaporation of the $CO_2$.

24. The method of claim 1, wherein the fluid is $CO_2$, wherein the selected device contains lithium that is converted to $Li_2CO_3$ by the $CO_2$, and further comprising adding a quantity of a material selected from the group consisting of dry air and oxygen to the container to avoid CO formation.

25. The method of claim 1, the selected device having a casing, wherein the selected device is placed in the container with the casing intact.

26. The method of claim 25, wherein the supercritical fluid pressure opens a breach in the casing to allow the supercritical fluid to access the electrolyte.

27. The method of claim 25, wherein the selected device is a lithium battery, and wherein the supercntical fluid pressure opens a safety pressure relief valve on the battery.

28. The method of claim 1, the selected device having a casing, wherein the casing is opened before the selected device is placed in the container.

29. The method of claim 28, wherein the casing is opened by a method selected from tbe group consisting of drilling, piercing, laser drilling, and milling before the selected device is placed in the container.

30. The method of claim 1, wherein the electrolyte contains a species that produces a Lewis acid when subjected to increased pressures and/or temperatures during the extraction process, further comprising adding a Lewis base to the container to control reactivity of the Lewis acid.

31. The method of claim 30, wherein the Lewis base is selected from the group consisting of ammonia, amines with the general formula $NH_xR_{3-x}$ (R =methyl, ethyl, propyl, butyl), and pyridine.

32. The method of claim 1, wherein the selected device is soaked in a static volume of supereritical fluid during extraction of the electrolyte.

33. The method of claim 1, wherein the supercritical fluid is continuously pumped through the container during extraction of the electrolyte.

34. The method of claim 1, further comprising reusing the fluid for multiple extraction processes.

* * * * *